April 18, 1967 R. G. BIRKHOLZ 3,314,338
MACHINE FOR FOLDING CARTON BLANKS
Filed Nov. 27, 1964 9 Sheets-Sheet 1

April 18, 1967 R. G. BIRKHOLZ 3,314,338
MACHINE FOR FOLDING CARTON BLANKS

Filed Nov. 27, 1964 9 Sheets-Sheet 5

April 18, 1967 R. G. BIRKHOLZ 3,314,338
MACHINE FOR FOLDING CARTON BLANKS
Filed Nov. 27, 1964 9 Sheets-Sheet 6

Fig. 6b.

3,314,338
MACHINE FOR FOLDING CARTON BLANKS
Richard G. Birkholz, Milwaukee, Wis., assignor to Dorr Sales & Engineering Co., Inc., Milwaukee, Wis., a corporation of Wisconsin
Filed Nov. 27, 1964, Ser. No. 414,144
5 Claims. (Cl. 93—49)

This invention relates to the art of carton manufacture, and has more particular reference to improvements in machines for folding the end flaps of prescored carton blanks from extended positions at which they are coplanar with the blanks to positions flatwise superimposed upon the blanks to bring their distal edge portions into contiguous relation for securement, so that the blanks can be shipped in the form of flattened tubes.

Heretofore, despite attempts at automation, this flap folding operation was generally performed manually, regardless of whether the blanks were designed to have their end flaps secured together by tape with their distal edges opposing one another, or whether the flaps were adhesively secured together with their distal edge portions in overlapping relation. In either case, a workman stationed at the loading end of a flap securing machine, such as a "taper," manually folded the end flaps of each prescored carton blank inwardly and down onto the blank, and then feed the folded blank into the bite of upper and lower feed rollers at the receiving end of the flap securing machine.

It is the purpose of this invention, therefore, to provide a machine for folding down the end flaps of prescored carton blanks into either edgewise abutting or overlapping relation, as the case may be, and for delivering such blanks with their flaps in properly folded condition to the feed rollers at the receiving end of a flap securing machine such as a "taper." More specifically, it is a purpose of this invention to provide a carton blank folding machine of the character described which can be employed to feed folded carton blanks to a flap securing machine without entailing disassembly of any of the parts of the latter at its receiving end.

In this respect, it is a further purpose of the invention to provide a carton blank folding machine of the character described which is exceptionally compact and light enough in weight to enable it to be readily pushed about on casters into feeding relation with any desired one of a battery of flap securing machines.

Another purpose of this invention resides in the provision of a machine for folding down the end flaps of prescored carton blanks, which features quick and easy adjustability for accommodation of different sizes of rectangular blanks having regular outlines as well as different sizes of so called die cut blanks which have highly irregular outlines.

Still another purpose of this invention resides in the provision of a folding machine of the character described which features flap straightening means that is operable to square the proximal edges of improperly folded flaps at the delivery end of the machine to assure proper presentation of the folded blanks to a flap securing machine fed by the blank folding machine of this invention.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention, constructed according to the best mode so far devised for the practical application of the principles thereof, and in which:

FIGURE 6a is a side elevation of the rear half of the machine shown in FIGURE 5a.

Referring now more particularly to the accompanying drawings, wherein like reference characters identify like parts throughout the views, the numeral 10 generally designates the base for the folding machine of this invention. The base comprises an elongated welded frame structure including opposite side channels 11 which seat on cross channels 12, pairs of front and rear legs 13 and 14, respectively, having their upper ends secured to the bottoms of the side channels and the backs of the cross channels, and braces 15 joining the lower end portions of the legs.

Figure 6A:
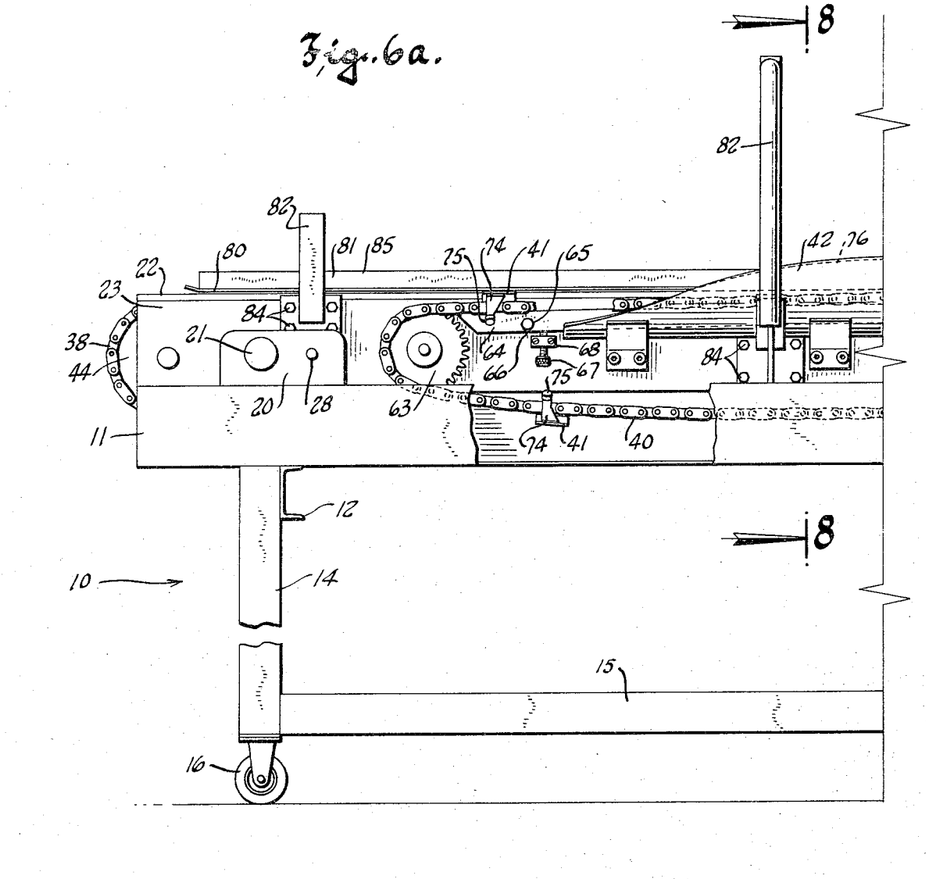
Figure 6B:
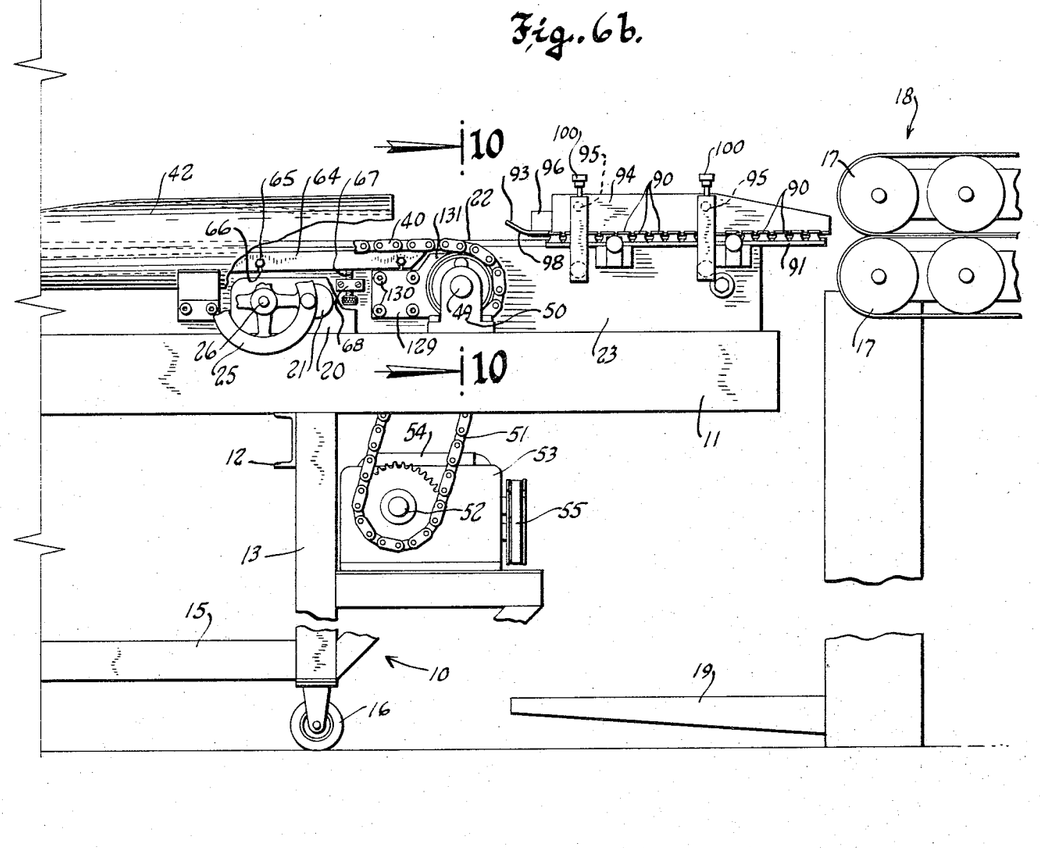
FIGURE 6b is a side elevation of the forward half of the machine shown in FIGURE 5b.

Casters 16 secured to the bottoms of the frame legs enable the machine to be readily moved into operative relation to the feed rollers 17 at the receiving end of any desired flap securing machine, such as the taping machine indicated at 18 in FIGURE 6b. It will be appreciated that the casters may be of the type that can be locked against movement after the folding machine has been properly located relative to the feed rollers 17 at the receiving end of the flap securing machine.

Referring to FIGURE 6b, it will be noted that the front legs 13 are set back a substantial distance from the forward ends of the side channels 11, so as to enable the latter to be moved right up to the receiving end of the taping machine without without interference from the elevatable carton blank supporting platform 19 with which such taping machines are customarily provided and, of course, without entailing removal of the platform from the taping machine.

Pairs of transversely opposite bearing or supporting blocks 20 are mounted on the tops of the side beams 11 at locations directly over the legs 13 and 14. A shaft 21 extends transverely between each pair of blocks and has its ends fixed in suitable holes therein in any desired fashion. The shafts 21 are parallel, and their axes lie in a common horizontal plane spaced a slight distance above the tops of the side beams 11.

Prescored carton blanks to be folded are supported on the tops 22 of a pair of elongated parallel rails 23, substantially coextensive in length with the side beams 11, and transversely translatably supported by the shafts 21 as by hub members 24 slidably encircling the shafts and fixed to the inner sides of the rails. Each of the rails is adapted for translatory adjustment toward and from the other rail in consequence of manual rotation of a hand wheel 25 for said rail. The hand wheels are fixed to the outer ends of coaxial screw shafts 26 that are rotatably journaled in the forward blocks 20, and which have their inner end portions passing through the rails but threadedly engaged in nut-like members 27 fixed to their inner sides.

A second pair of coaxial screw shafts 28 is provided near the rear or loading end of the machine. The latter similarly have their outer ends rotatably journaled in the rear blocks 20 and their inner end portions are likewise threadedly engaged in nut-like members 27 carried by the rails. Both pairs of screw shafts, of course, are held against axial motion by the blocks 20 in which they are rotatably journaled.

An endless chain 28 trained over sprockets 29 on the screw shafts for each rail assures that said shafts will be turned in unison in the same direction, in consequence of rotation of the hand wheel for said rail.

Figure 1:
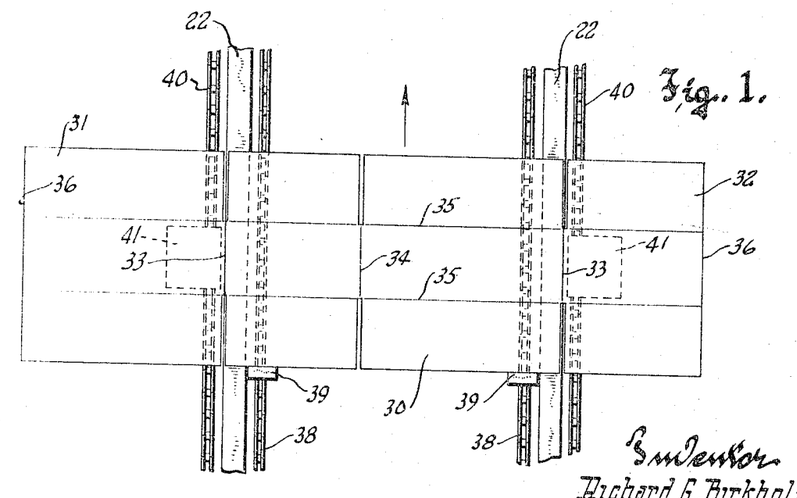
FIGURE 1 is a more or less diagrammatic plan view showing a rectangular prescored carton blank in position on the loading end of the machine.

The rails are adjustable toward and from one another to enable the distance between their outer sides to correspond to the spacing between the parallel end scores of any size prescored carton blank to be folded by the machine. FIGURE 1 illustrates this adjustment of the rails when prescored rectangular carton blanks such as indicated at 30 are to be run through the machine to have their end flaps 31–32 folded flatwise down onto the blank in the manner seen in FIGURE 2. The blank here shown has a regular rectangular outline, and in addition to parallel end scores 33 which define the flaps 31–32, has an intermediate score 34, parallel to the scores 33, and a pair of parallel scores 35 which extend lengthwise of the blank, normal to the scores 33–34. The scoring 35 define flaps which are adapted to collectively form the top and bottom of a carton. The end flaps 31–32 defined by the scores 33 are adapted to define one side and the adjacent end wall of a carton, while the scores 33–34 cooperate to define the opposite side and other end wall of a carton.

Figure 2:
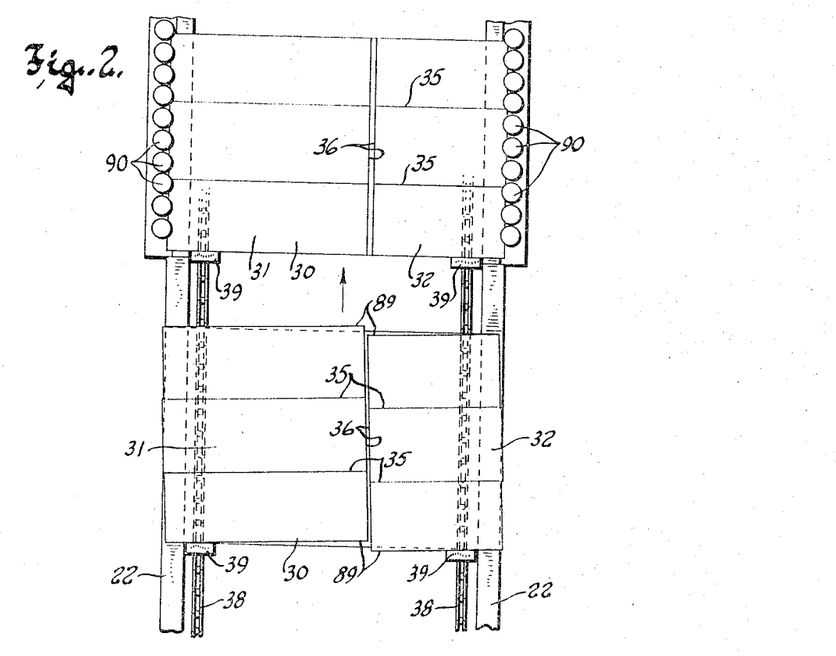
FIGURE 2 is a similar diagrammatic plan view showing how improperly folded blanks are squared at the delivery end of the machine.

The carton blank shown in FIGURES 1 and 2 is of the type having end flaps the distal edges 36 of which are disposed in contiguous opposing relation when they are folded down onto the blank in the manner seen in FIGURE 2, so that the flaps may be secured together by a length of tape, not shown, applied over those edge portions of the folded down flaps which lie between the scores 35. In other words, the carton to be formed by blanks such as seen in FIGURES 1 and 2 will have a taped corner joint, as distinguished from an overlapped and glued corner joint.

As seen in FIGURE 1, prescored carton blanks 30 such as described are adapted to be individually loaded onto the rails at the rear of the machine with their parallel end scores 33 in register with the outer sides of the rails. This may be accomplished in an automatic fashion, if desired, using a feed hopper of known construction at the rear of the machine, into which prescored blanks are loaded, and from the bottom of which the blanks are individually and successively fed onto the loading end of the folding machine in the proper positional relationship to the rails 23.

A first pair of endless chains 38 carried by the rails 23 at their inner sides and having lengthwise equispaced blank engaging fingers 39 mounted thereon provides for advancing the carton blanks through the machine.

A second pair of endless chains 40 carried by the rails 23 at their outer sides have hinged cam operated plates 41 mounted thereon at lengthwise equispaced locations corresponding to the spacing of the fingers 39, to effect folding of the end flaps 31–32 of the carton blanks advancing along the rails to their positions seen in FIGURE 2. The hinged cam operated plates are activated to perform their flap folding functions by means of elongated cams 42 mounted on the rails 23 at opposite locations in a folding zone intermediate the ends of the rails.

The blank advancing chains 38 are trained over idler sprockets 44 individually mounted on the rear end portions of the rails 23 for rotation on a common transverse axis, and they extend around driven sprockets 45 similarly individually mounted on the front portions of the rails for rotation on a common transverse axis. Each of the driven sprockets 45 has a companion sprocket 46 to which it is affixed with the companion sprocket between it and the adjacent rail 23. Substantially short endless drive chains 47 connect the companion sprockets 46 with drive sprockets 48 which are axially slidably keyed on a drive shaft 49. The drive shaft extends transversely across the machine and has its opposite ends journaled in bearing blocks 50 on the tops of the side beams 11 for rotation on a horizontal axis located a short distance ahead of the forward ends of the cams 42.

Driving torque is transmitted to the drive shaft 49 from which the blank advancing inner chains 38 are driven through a chain drive connection 51 between the shaft 49 and the output shaft 52 of a speed reducer 53. The speed reducer, in turn is driven by an electric motor 54 through a belt 55.

The blank advancing chains are driven by the above described mechanism with their top stretches moving forwardly and constrained to travel in paths which are parallel to and only slightly below the tops of the rails 23. Chain guide members 57 are provided for this latter purpose. Each chain guide member is in the form of an elongated blade mounted on the inner side of one of the rails 23 as by studs 58, and having a horizontal upper edge upon which the rollers of its chain are suported, and which is loosely embraced by the side links of the chain, as seen best in FIGURES 7, 8 and 9. The fingers 39 on the chains 38, of course, project upwardly beyond the level of the tops of the rails 23 so as to assure their engagement with the rear edges of prescored carton blanks loaded onto the rails.

The blank engaging fingers 39 are secured to the inner chains 38 at locations opposite one another when the blanks to be folded have straight rear edges such as seen in FIGURES 1 and 2. They are detachably securable to ears 60 on the chain, formed as flanges on the chain links at regular intervals along the length of the chain, so as to enable the fingers to be located in any desired spaced relation necessary for the accommodation of carton blanks of different sizes therebetween.

The outer chains 40 carrying the hinged cam operated plates 41 are trained over drive sprockets 62 on the drive shaft 49, and extend around idler sprockets 63 individually mounted on the rails 23 for rotation about a common transverse axis a short distance behind the rear end portions of the cams 42. The upper stretches of the chains 40 likewise move forwardly during operation of the machine, and they are constrained to travel in paths lengthwise adjacent to but slightly below the tops of the rails 23 by means of elongated guide members 64, extending lengthwise between the idler and drive sprockets.

Like the guides for the inner chains, the guide members 64 are also in the form of relatively thin and narrow blades that are supported from the rails at their outer sides by means of a plurality of studs 65 fixed in the rails.

The chain rollers ride on the straight upper edges of the guide members and their links slidingly straddle the upper edge portions of the guides. However, the guide members 64 are mounted for up and down adjustment, for a purpose to be described shortly, and for this reason their mounting studs are received in slots 66 that open to the lower edges of the guide members to enable them to be raised or lowered when their stud nuts are loosened. The lower edges of the guide members 64 rest on the extremities of a plurality of adjusting screws 67 that are threaded upwardly through small blocks 68 fixed on the outer sides of the rails 23. To adjust the height of the guide members, their outer stud nuts are first loosened and the adjusting screws 67 are then turned in directions to either lift or lower the guide members to the desired elevation, after which the outer stud nuts are again tightened to firmly hold the guides in their adjusted positions.

Figure 7:
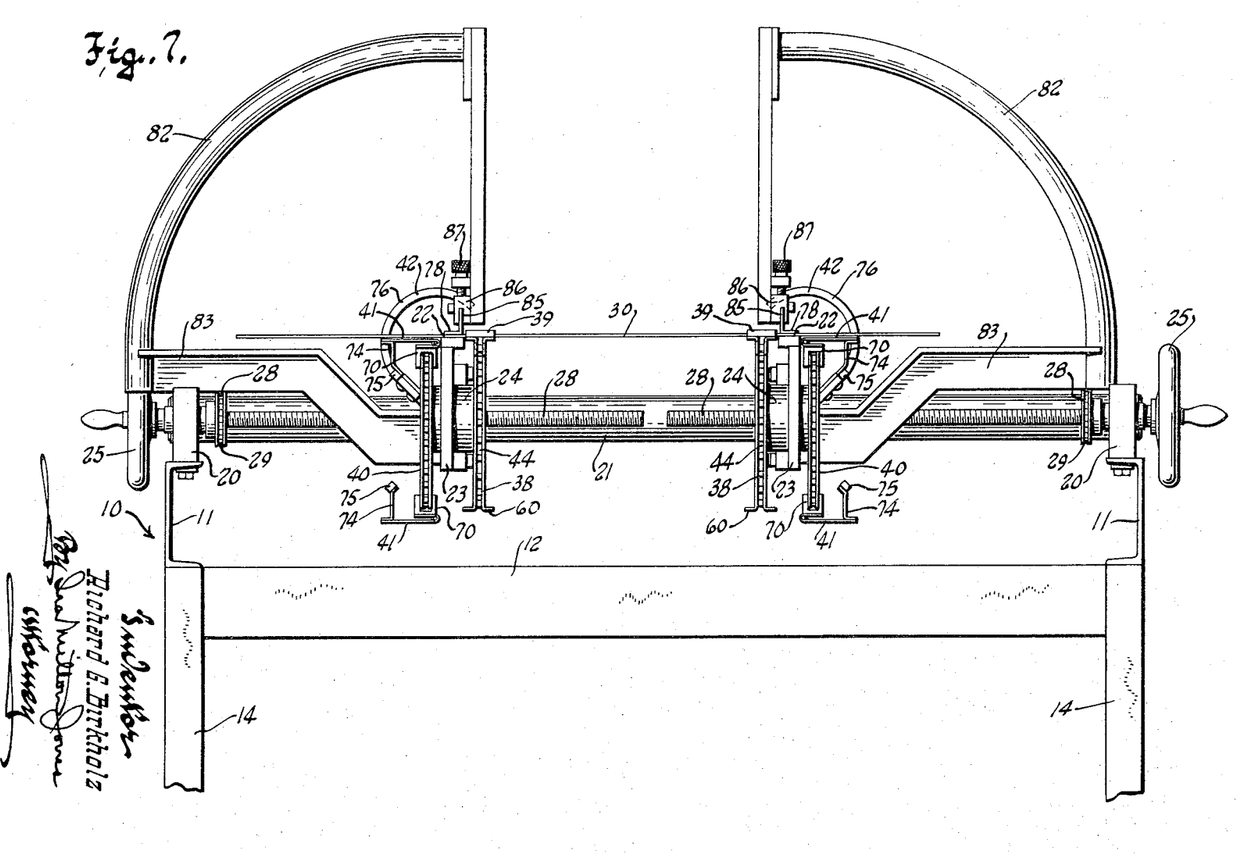
FIGURE 7 is a rear elevational view of the machine, at an enlarged scale.

Adapters 70 on the outer chains 40 provide for attachment of the hinged cam operated plates 41 to their chains at different equispaced locations corresponding to the spacing of the blank engaging fingers. As seen best in FIGURES 8, 9 and 11, each of the hinged plates has a short mounting leg 71 by which it is attached to its adapter 70, with its hinge directly adjacent to its side rail 23 and the axis of the hinge parallel to the top stretch of its chain. A torsion spring 72, seen best in FIGURE 11, reacts between the adapter 70 and the plate 41 to yieldingly hold the plate in a horizontal position, substantially normal to and extending outwardly from the adjacent side rail as seen in FIGURE 7, and defined by the engagement of the plate with a rubber bumper 73 on the leg 71.

An arm 74 fixed to the underside of each plate 41 carries a cam follower roller 75 for cooperation with the cam 42 at its side of the machine.

Each cam has an elongated edge 76 which may be said to extend along a substantially steeply pitched helical path concentric to the axes of the adjacent hinge plates on the upper stretches of the chains. At their rear the edges 76 of the cams are disposed outwardly of the rails and below their tops, for engagement by the rollers 75 on the hinge plates as the latter are advanced toward the cams while maintained in their horizontally extended positions seen in FIGURE 7. After the rollers 75 ride onto these lower rear edges of the cams and move forwardly therealong, the plates 41 are gradually swung upwardly and inwardly thereby, and over the rails due to the helical shape of the cam edges, until at the front end portions of the cams, the plates are held in inverted positions over and parallel to the rails, as seen in construction lines in FIGURE 8. Note that the forward edge portions of the cams are straight and substantially overlie the inner chains 38, which they face at angles 180° opposite the rear edge portions of the cams. Hence, the hinge plates are held in flatwise inverted positions by the cams for a short period of travel before they are carried past the cams and return to their outwardly extended positions under the influence of their torsion springs 72.

Consequently, when the hinged plates 41 are located beneath the end flaps 31–32 of prescored carton blanks being advanced from the loading end of the machine by the fingers 39 on the blank advancing chains 38, the plates, in being gradually swung to their inverted positions by the cams, will similarly act upon and swing the carton end flaps 31–32 inwardly toward one another and then flatwise downwardly onto the blank to thus effect the flap folding function of the machine.

The carton blanks are held against upward movement away from the tops of the rails during this flap folding operation by means of thin but rigid elongated hold down blades 78 which flatwise overlie the tops of the rails and extend lengthwise thereof from locations slightly forwardly of the medial portions of the cams 42, to slightly beyond the drive shaft 49. The rear portions of the hold down blades 78 are superimposed upon and fixed as at 79 to the horizontal flanges 80 of elongated angle shaped guides 81 which are in turn supported by pairs of transversely opposite overhead bridge structures 82. The bridge structures are carried by outrigger bridge mounts 83 secured to the outer side of the rails 23 as by bolts 84. The upstanding legs 85 of the guides 81 are adjustably mounted on the bridge structures by means of slide blocks 86 which can be moved up and down by screws 87 to adjust the spacing of the horizontal flanges 80 of the guides with respect to the tops of the rails in correspondence with the thickness of the carton blanks which are to be acted upon by the machine.

The guides 81 extend rearwardly from the hold down blades 78 to the loading end of the machine, and are adapted to lightly engage the upper surfaces of carton blanks loaded onto the rails. One pair of opposite bridge structures 82 for supporting the guides is preferably located adjacent to the rear of the machine, just forwardly of the rear rail supporting shaft 21, while the other pair of opposite bridge structures is located forwardly of the rear of the cams 42, intermediate the ends of the latter. The guides 81 terminate a substantial distance rearwardly of the forward ends of the cams so that their upstanding legs 85 cannot interfere with the folding operation being performed on the carton end flaps, since, at the forward termini of the guides 81, the end flaps will be folded to substantially vertical positions.

From the description thus far, it will be apparent that all portions of the hinged flap folding plates 41 must lie beneath the plane of the tops of the rails when the plates are in their laterally extended positions, to thus assure supporting engagement of the carton blanks with the tops of the rails. Consequently, the chain guide members 64 are so adjusted at the loading end of the machine that the hinges of the plates 41 will be below the level of the tops of the rails.

Figure 8:
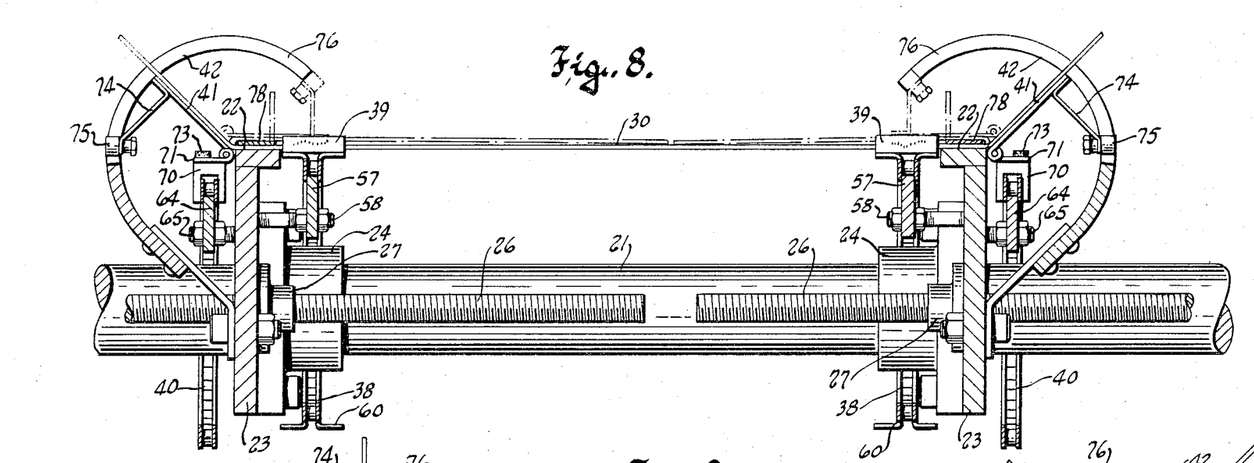
FIGURE 8 is an enlarged cross sectional view taken through FIGURE 6a on the plane of the line 8—8, illustrating how the end flaps of prescored carton blanks can be simultaneously folded down onto the blanks to bring their distal edges into opposing contiguous relation when the carton is to have a taped corner joint.
Figure 9:
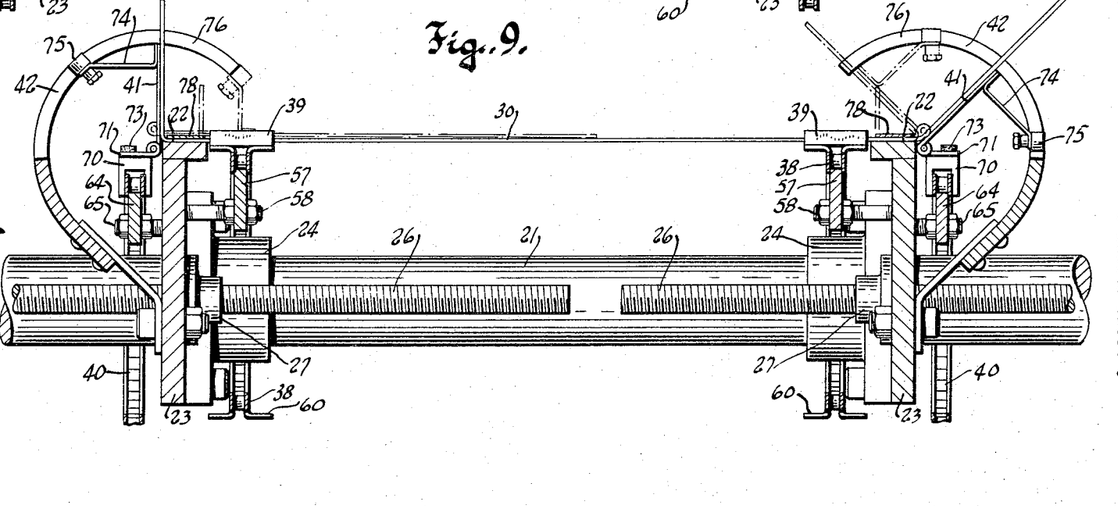
FIGURE 9 is an enlarged cross sectional view corresponding to FIGURE 8 but illustrating how the end flaps of carton blanks are folded one in advance of the other when their distal end portions are to be brought into overlapping relation for the formation of a glued corner joint on the carton.

It will also be apparent that if the hinged plates 41 are to be capable of flatwise folding the carton end flaps down onto the blank as the plates travel along the forward end portions of the cams 42, that the plates could not clear the outer corners at the tops of the rails unless the hinges on the plates were disposed at levels above the tops of the rails. For this reason, the forward end portions of the chain guide members 64 are adjusted to positions substantially higher than the rear portions thereof. Hence, the top edges of the guide members are inclined upwardly and forwardly, as indicated best in FIGURES 6a and 6b, from locations below the tops of the rails at the loading end of the machine, to locations above the tops of the rails at the forward end portions of the cams 42. In fact, the forward end portions of the chain guide members should be at such levels above the tops of the rails that the hinge plates 41, when at the forward ends of the cams, can be held thereby in horizontal positions over the rails, with the then doubled thickness of the carton blank as well as the hold down blades 78 thereunder. This condition is best illustrated in the construction line positions of the plates 41 seen in FIGURE 8.

Where the carton blanks are of the type adapted to produce a carton having a taped corner joint, the hinged plates 41 can be located opposite one another on their chains 40, so as to effect simultaneous folding of the end flaps of the blank in the manner seen in FIGURE 8. If due to slight imperfections in scoring or for any other reason the end flaps 31–32 of the carton blank are not folded with their leading and trailing edges in transverse alignment, such as indicated diagrammatically at 89 in FIGURE 2, they will be automatically straightened or squared by their passage between opposite rows of freely rotatable edge rollers 90 carried by the rails 23 at the delivery end of the machine.

The edge rollers are mounted on cleats 91 secured to the rails 23 for a degree of adjustment transversely of the machine, with the rollers of each set arranged in equispaced relation and for rotation on axes lying in a common vertical plane parallel to but spaced outwardly a slight distance from the plane of the outer side of their adjacent rail. The rollers have substantially shallow V-shaped circumferential grooves in which the proximal edges of the end flaps on the folded carton blanks are received as the advancing blanks are moved past the front portions of the cams 42. Hence, an improperly folded blank 89 will be acted upon by the rollers 90 as the folded blanks approach the delivery end of the machine, and the pressure exerted by the rollers on the proximal edge portions of the improperly folded end flaps will straighten the folds to square the flaps with the body of the blank therebeneath.

The action of the edge rollers 90 is best seen in FIGURE 2, where a properly folded blank is shown passing through the squaring zone between the rollers, and a following improperly folded blank is being advanced toward the squaring zone.

An elongated cantilever supported hold down shoe 93 is preferably located over the distal edge portions of the flaps on folded blanks traveling through the squaring zone, to assure against the flaps springing away from their folded down positions while the blanks are being transferred to the taping machine. This shoe extends lengthwise of the machine at a location intermediate the sets of edge rollers 90, and is carried by a bracket 94 that is adjustably supported by a pair of transversely extending rods 95 for side to side movement to enable the shoe to be set directly over the contiguous distal edge portions of the folded down end flaps. The shoe has an upstanding flange 96 secured to the bracket 94 by bolts 97, and its rear end portion is curved upwardly as at 98 to facilitate passage of the folded blanks thereunder.

The blade mounting bracket 94 has a pair of hubs 99 thereon in which the rods 95 are slidably received, and which carry set screws 100 to enable the bracket to be secured to the rods at different positions transversely of the delivery end of the machine. Each of the rods 95 has an outer end which is anchored in a mounting bar 101 that is secured to the outer side of one of the rails 23 in any suitable manner, with the bar extending a distance above the top of the rollers to dispose the rods 95 in spaced relation to folded blanks passing through the squaring zone.

The hold down shoe 94, of course, cooperates with the edge rollers to facilitate proper delivery of the folded blanks to the feed rollers of a taping machine or the like.

Figure 3:
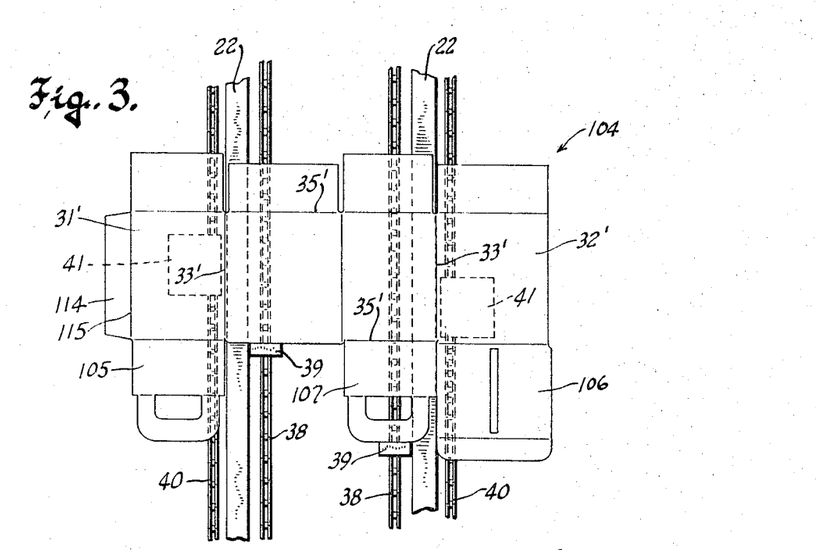
FIGURE 3 is a plan view similar to FIGURE 1, but showing a die cut carton blank of irregular outlines in position on the loading end of the machine.

One of the outstanding features of the carton folding machine of this invention is that it is easily capable of handling prescored die cut carton blanks having an irregular outline, as for instance the blank seen at 104 in FIGURE 3. Blanks of this type, when properly loaded onto the machine to have their end flaps 31'–32' folded down in the manner described in connection with the rectangular blank 30, usually have individual top and bottom wall forming flaps that project different distances forwardly and rearwardly from the transverse scores 35' of the blank. Hence, the leading and trailing edges of the blank present a series of steps which are offset in directions lengthwise of the scores 33' defining the end flaps 31'–32'.

The die cut blank 104 shown has a first handle forming flap 105 hingedly connected by the rear transverse scoring 35' to one end flap 31', a top wall forming flap 106 hingedly connected by the rear transverse scoring 35' to the opposite end flap 32' and longer than the handle flap 105, and a second handle forming flap 107 identical to the first but hingedly connected by the rear transverse scoring 35' to the rear of the side wall forming panel from which the end flap 32' projects. The other side wall forming panel which is adjacent to the end flap 31' terminates substantially at the rear transverse scoring 35'.

Bottom wall forming flaps project different distances forwardly from the front transverse scoring.

When such die cut blanks are fed onto the machine at its loading end, with their end scores 33' in proper register with the outer sides of the rails 23, the blank engaging fingers 39 on one of the blank advancing chains can only engage rearwardly facing edges of the blanks at locations between their two handle forming flaps 105–107, namely substantially at locations corresponding to that of the rear transverse scorings 35'. The blank engaging fingers 39 on the other blank advancing chain can only engage the rear edges of the handle forming flaps 107, at locations spaced a substantial distance rearwardly from the rear transverse scorings 35'.

While it might be possible to approximate this desired relationship between the fingers 39 on the two blank advancing chains 38 by relocating the fingers on the chains and possibly by substitution of either narrower or wider blank engaging fingers for those on one of the chains, such adjustment and/or replacement, if it were successful, would entail considerable labor and down time for the machine.

According to this invention, a relatively simple operation, usually entailing but a few minutes time, is all that is necessary to adjust the blank engaging fingers 39 from positions opposite one another on their chains 38, as seen in FIGURE 1, to positions at which the fingers on one chain 38 either lead or trail those on the other chain 38 by the distance necessary for proper engagement of the fingers with transversely spaced rearwardly facing edges of the blanks to be acted upon, regardless of the degree of offset between said edges lengthwise of the machine.

In general, this adjustment involves either advancing or retarding one of the chains 38 relative to its companion chain. This can be readily accomplished in the machine of this invention, by the adjusting mechanism seen best in FIGURE 12. As therein seen, the driven sprocket 45 for one of the chains 38 is secured directly to its companion sprocket 46 by four cap screws 110. These screws are threaded into alternate tapped holes 111 in the drive sprocket, arranged in equispaced relation along a circle concentric to its axis of rotation. The screws pass through arcuate angularly equispaced slots 112 in the driven sprocket 45, which slots have a length slightly greater than the spacing between the holes 111 so that each slot can fully span two adjacent tapped holes 111 in the drive sprocket. Hence, when the screws are loosened, the driven sprocket can be turned on the hub of its drive sprocket 46 through an angle of slightly more than 45°, to enable the chain 38 trained thereover to be bodily advanced or retarded a correspondingly limited extent to thus afford fine adjustment of all of the blank engaging fingers 39 thereon relative to those on the other chain 38. Since the slots 112 can be brought into position spanning any desired pairs of tapped holes 111 when the cap screws 110 are backed out of their holes, it will be apparent that fine adjustment of the driven sprocket 45, and its chain, is possible throughout a full 360° of rotation of the driven sprocket.

Figures 10, 11, 12:
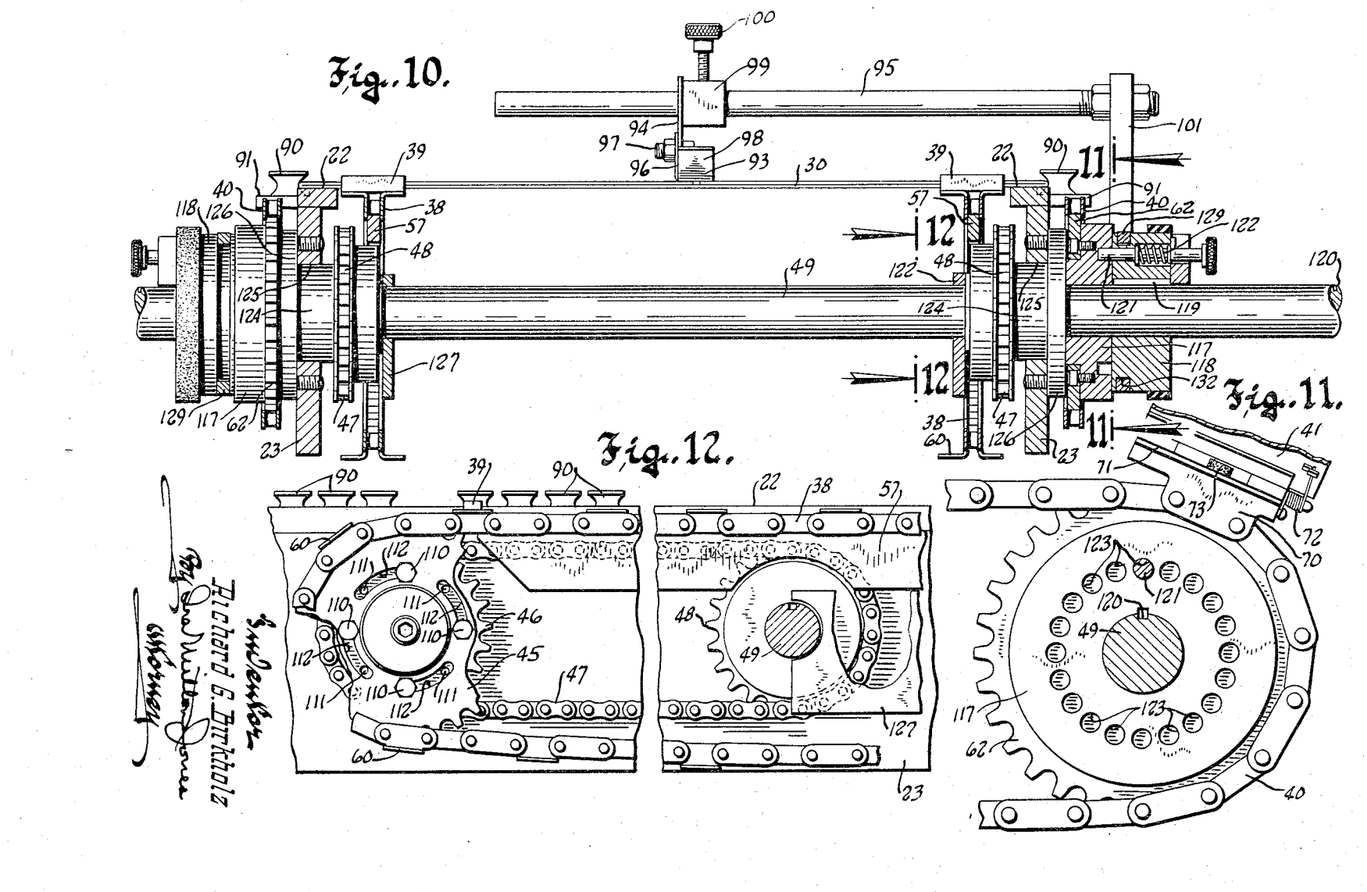
FIGURE 10 is an enlarged cross sectional view taken through FIGURE 6b on the plane of the line 10—10.
FIGURE 11 is an enlarged detail cross sectional view taken on the plane of the line 11—11 in FIGURE 10.
FIGURE 12 is an enlarged detail view taken on the line 12—12 in FIGURE 10.

Coarse adjustment of the chain trained over the drive sprocket 45 is, of course, effected when the cap screws 110 have been removed from the drive sprocket 46, which enables the chain trained over its then freely rotatable driven sprocket 45 to be advanced or retarded any desired distance before the screws are reinserted and fine adjustment made in the manner described above.

Because of this adjusting means for one of the chains 38 therefor, the blank engaging fingers 39 on the chains 38 can be made to engage widely offset rearwardly facing edges on the prescored carton blanks, without necessarily relocating all of the fingers on one of the blank advancing chains.

Figure 4:
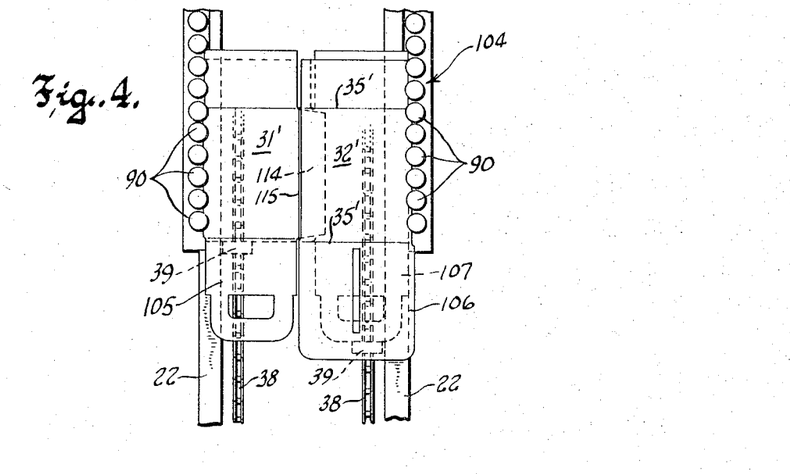
FIGURE 4 is a plan view showing the die cut blank in properly folded condition at the delivery end of the machine.
Figure 5A:
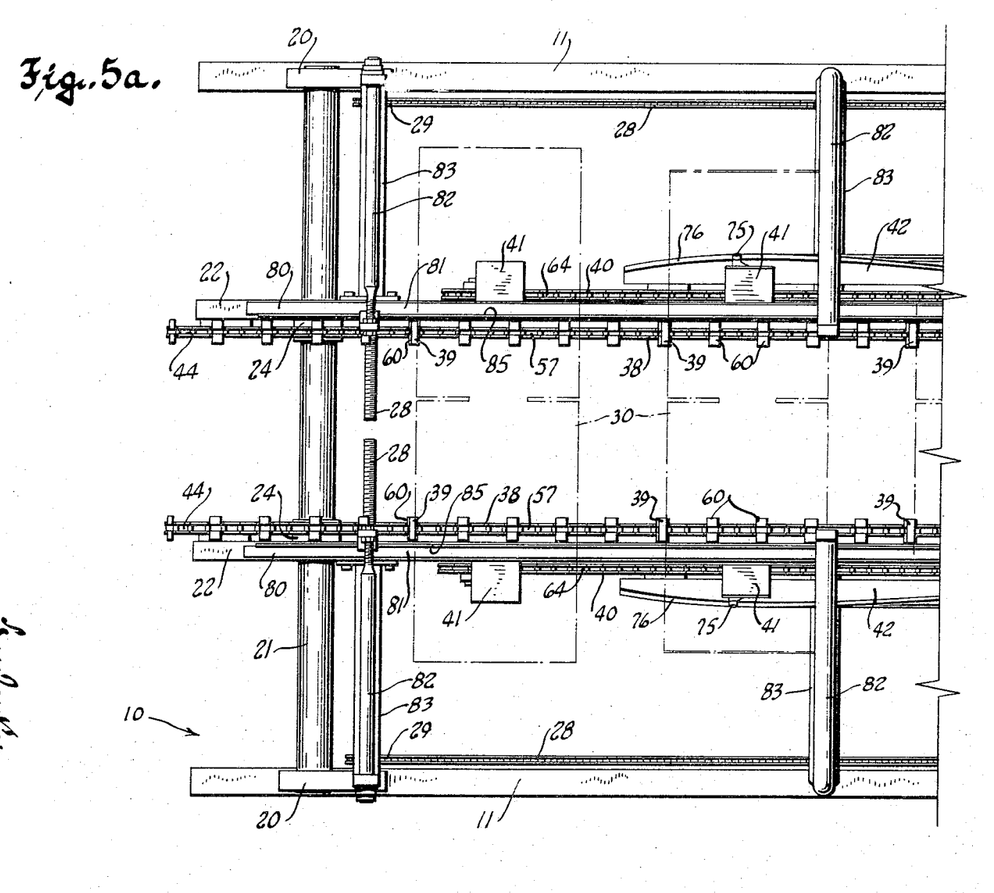
FIGURE 5a is a plan view of the rear half of the machine, upon which prescored carton blanks to be folded are loaded.
Figure 5B:
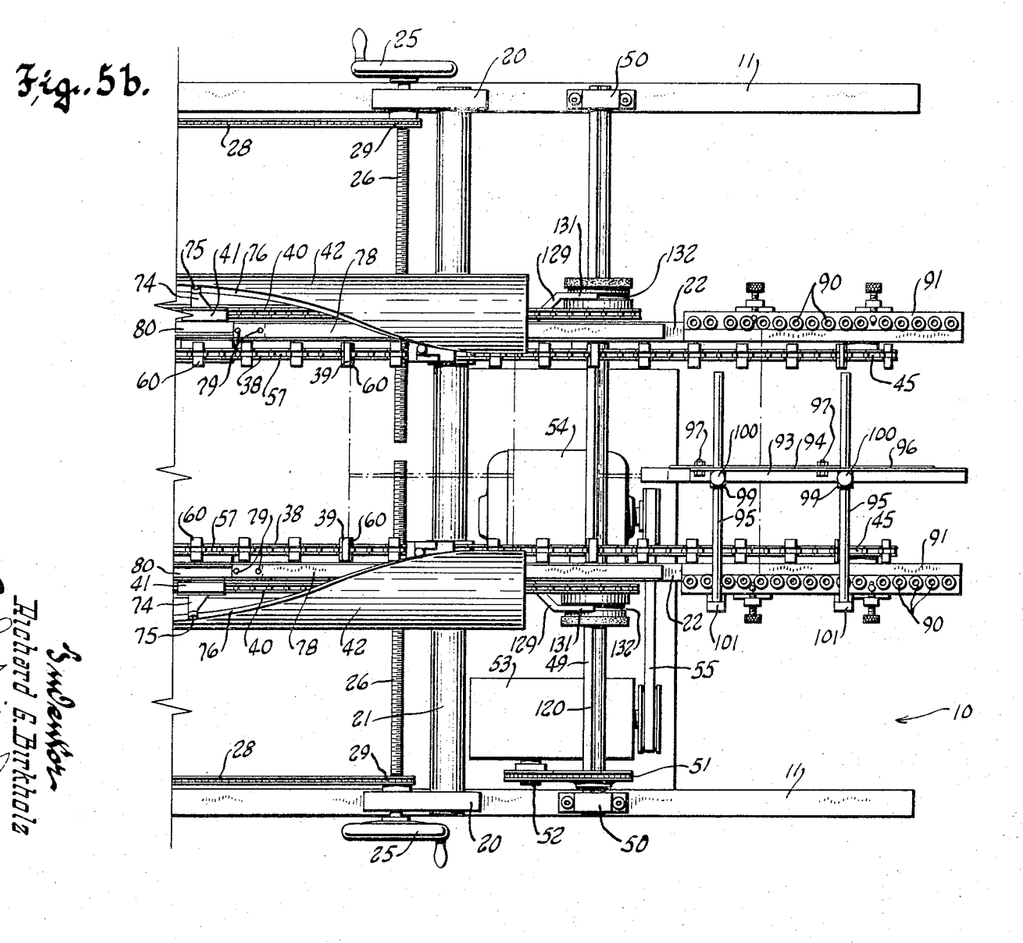
FIGURE 5b is a plan view of the forward half of the machine, from which the folded blanks discharge.

Similarly, the hinged cam operated folder plates 41 on one of the outer chains 40 can be simultaneously advanced or retarded relative to those on the other outer chain, to enable the plates to be more or less centered along the longitudinal dimensions of the end flaps to be folded thereby. In this connection, the end flaps of the die cut blank 104 seen in FIGURES 3 and 4, are considered to comprise those portions of the blank which lie outwardly of the end scores 33′ and which include whatever top, bottom or handle forming flaps that may be connected to the end flaps.

As seen in somewhat exaggerated form in FIGURE 3, therefore, the hinged plates 41 on the left hand chain 40 are preferably adjusted to positions leading the plates 41 on the other outer chain, not only because of the shape and size of the right hand end flap, but also because the latter end flap must be folded down onto the blank with its distal edge portion in overlapping relation to a glue flap 114 hingedly connected by a score 115 to the outer end of the end flap 31′. This means, of course, that each hinged plate 41 on the left hand outer chain will encounter its cam 42 and start to fold the left hand end flap 31′ inwardly over the carton blank before its companion right hand hinged plate 41 begins to fold its end flap 32′ upwardly over the blank, in the manner indicated in FIGURE 9.

In the present case, the drive sprocket 62 for each of the outer chains is readily releasably connected to the drive shaft 49 upon which it is mounted, to enable either of the outer chains to be advanced or retarded relative to the other. As seen best in FIGURES 10 and 11, each drive sprocket 62 is fixed to a hub 117 that is freely rotatably received on the drive shaft 49, inwardly adjacent to a collar 118 which is fixed to the drive shaft 49 by means of a key 119 that axially slidably engages in a long keyway 120 in the shaft. A plunger 121 carried by the collar is biased by a spring 122 axially inwardly to an operative position at which the inner end of the plunger engages in one of a number of holes 123 in the sprocket hub 117, arranged in a circle concentric to the axis of the drive shaft.

When the plunger 121 is manually retracted to disengage its inner end from one of the holes 123 in the sprocket hub, the sprocket is released from the drive shaft for rotation in either direction, so as to enable the outer chain 40 trained thereover to be either advanced or retarded relative to the other outer chain. When the desired positional relationship between the hinged plates 41 on the chains is reached, the plunger 121 is reengaged in the nearest hole 123 to again drivingly reconnect the sprocket 62 with the drive shaft.

If the sprocket hub 117 is provided with the number of holes 123 seen in FIGURE 11, the sprocket can be angularly adjusted to each of twenty different positions on the drive shaft, to afford a wide range of adjustment for the hinged plates 41 carried by its chain relative to those on the other chain.

Again referring to FIGURE 10, it will be noted that the rails 23 cooperate with the bearings 50 on the side channels 11 to rotatably support the drive shaft 49. For this purpose, each rail has a bearing hub 124 mounted in a hole 125 in the rail, and affixed thereto by means of a flange 126 on the bearing hub bolted to the outer side of the rail.

The bearing hubs 124 project a short distance beyond the inner sides of their rails 23 and serve to hold the drive sprockets 48 for the inner chains 38 spaced from the rails. The drive sprockets 48 are loosely held against the adjacent ends of the bearing hubs 124 by means of yokes 127, one for each drive sprocket, overlying the inner face thereof and having an outwardly offset attaching portion that is secured to its adjacent rail as by screws, not shown. Since the drive sprockets 48 are axially slidably keyed to the drive shaft, it follows that they, as well as the inner chains 38, are thus constrained to move with the rails during lateral adjustment of the latter on their transverse ways 21.

The hubs 117 of the drive sprockets 62 for the outer chains 40 are loosely confined between their respective collars 118 and the flanges 126 of the bearing hubs 124. A pair of yokes 129 secured to the outer sides of the rails by screws 130, provides for holding the collars 118 against axial movement relative to their respective rails. Each of these yokes has a bifurcated end portion 131 which is received in a circumferential groove 132 in its associated collar 118, so as to hold the collar in predetermined spaced relation to the outer side of its adjacent rail.

The keys 119 drivingly connecting the collars with the drive shaft 49 also serve as splines which permit the collars, and the drive sprockets 62, to slide laterally back and forth with the rails during adjustment of the spacing therebetween, without disrupting the driving connections between the shaft 49 and the outer chains 40.

From the foregoing description, together with the accompanying drawings, it will be apparent to those skilled in the art that this invention provides a carton flap folding machine that features unusual versatility in that it is readily adjustable to accommodate carton blanks of a wide variety of sizes and shapes, and of types which are adapted to have either taped or glued corner joints.

What is claimed as my invention is:

1. A machine for folding flat carton blanks along parallel end scores to bring the end flaps defined thereby flatwise down onto the blank, said machine having a loading end for blanks to be folded and having a delivery end from which folded blanks discharge, and being characterized by the following:

(A) a pair of parallel blank supporting rails extending horizontally from one end of the machine to the other, and adapted to flatwise support carton blanks to be folded with the end scores of such blanks substantially in line with the outer sides of the rails so that the carton end flaps extend laterally outwardly beyond the rails at the loading end of the machine;

(B) a pair of endless blank advancing chains carried by the rails at the inner sides thereof, with their upper stretches constrained to travel in unison toward the delivery end of the machine along paths lengthwise adjacent to the tops of the rails;

(C) blank engaging fingers on said chains to engage transversely spaced rear edge portions of carton blanks loaded onto the machine and carry the blanks through the machine;

(D) a pair of blank folder chains carried by the rails at the outer sides thereof, with their upper stretches constrained to travel toward the delivery end of the machine in unison with the blank advancing chains, along paths lengthwise adjacent to the tops of the rails;

(E) elongated transversely opposite cam means fixed with respect to the rails at a folding zone intermediate the ends of the machine;

(F) hinged cam follower means carried by the folder chains for engagement with the undersides of carton end flaps and cooperable with said cam means as the cam follower means travel through the folding zone to swing said end flaps upwardly and inwardly, flatwise down onto the carton blanks;

(G) a drive sprocket for each of said chains, over which the chain is trained;

(H) a drive shaft from which said drive sprockets are driven;

(I) and means providing a disruptable driving connection between the drive shaft and the drive sprocket for one of the folder chains by which the latter can be either advanced or retarded relative to the other folder chain, when said driving connection is disrupted, so as to provide for setting of the hinged cam means on the folder chains either at transversely opposite locations or with those on one folder chain either leading or trailing those on the other folder chain.

2. The machine of claim 1, further characterized by means providing a disruptable driving connection between the drive shaft and the drive sprocket for one of said blank advancing chains by which the latter can be either advanced or retarded relative to the other blank advancing chain, when said last named driving connection is disrupted, so as to provide for setting of the blank engaging fingers on the blank advancing chains either at transversely opposite locations or with those on one blank advancing chain either leading or trailing those on the other blank advancing chain.

3. A machine for folding carton blanks along parallel end scores to bring the end flaps defined thereby flatwise down onto the blank, said machine having front and rear ends and being characterized by:
(A) a pair of opposite blank supporting rails extending horizontally in parallel relation from end to end of the machine, and upon which carton blanks to be folded can be flatwise individually loaded at the rear of the machine with their end scores in line with the outer sides of the rails and their end flaps extending laterally outwardly from the rails;
(B) a pair of endless chains carried by each rail, at opposite sides thereof, with their upper stretches constrained to forward travel along paths which are lengthwise adjacent to the tops of the rails;
(C) blank engaging fingers carried by the inner chains at lengthwise equispaced locations for engagement with the rear edges of carton blanks loaded onto the rear portions of the rails and operable to advance the blanks toward the front of the machine during forward travel of the top stretches of their chains;
(D) hinged cam follower members carried by the outer chains at lengthwise equispaced locations, beneath the laterally extending end flaps of carton blanks being advanced by the pusher fingers;
(E) cam members fixed with respect to the rails at a folding zone intermediate the ends of the machine, adapted to act upon the cam follower members during forward travel of the top stretches of their chains and swing the same inwardly over the rails to thus effect folding of the carton end flaps flatwise down onto the blank;
(F) and means to drive said chains in unison, comprising
(1) a drive shaft,
(2) and means providing driving connections between the drive shaft and said inner and outer chains operable to drive the top stretches thereof forwardly, the driving connection between the drive shaft and one of said inner chains being disruptable to enable said designated inner chain to be either advanced or retarded relative to the other inner chain to thereby provide for adjustment of the positions of its blank engaging fingers relative to those on said other inner chain.

4. A machine for folding carton blanks along parallel end scores to bring the end flaps defined thereby flatwise down onto the blank, said machine having front and rear ends and being characterized by:
(A) a pair of opposite blank supporting rails extending horizontally in parallel relation from end to end of the machine, and upon which carton blanks to be folded can be flatwise individually loaded at the rear of the machine with their end scores in line with the outer sides of the rails and their end flaps extending laterally outwardly from the rails;
(B) means for advancing carton blanks loaded onto the rails toward the front of the machine with the blanks in uniformly spaced relation along the length of the rails;
(C) means for folding the laterally extending end flaps of cartons flatwise down onto the carton blanks during said advance thereof, comprising
(1) an endless chain carried by each rail at its outer side and driven with an upper stretch thereof traveling forwardly, lengthwise adjacent to the top of its rail,
(2) hinged cam follower means carried by said chains and spaced from one another along the length thereof in correspondence with the spacing at which carton blanks are advanced by said blank advancing means, each of said cam follower means including a folder plate adapted to travel along with an advancing carton blank beneath a laterally extending end flap thereof, with a flap engaging surface on the plate flatwise contiguous to the underside of the flap, and hinged to swing about an axis lengthwise of its chain from a normally extended position projecting laterally outwardly from its chain to an inverted position at which the plate overlies the adjacent rail,
(3) means yieldingly biasing said folder plates to said extended positions thereof,
(4) and elongated cam means fixed with respect to the rails at a folding zone intermediate the ends of the machine, along which the cam follower means ride to effect such inversion of the folder plates;
(D) and chain guide means fixed with respect to the rails, for constraining the upper stretches of said chains to travel in slightly upwardly inclined paths which disposed the hinge axes of the folder plates thereon slightly below the tops of the rails at locations rearwardly of the cam means, and disposed said hinge axes of the plates slightly above the tops of the rails at the front end portions of the cam means.

5. The machine of claim 4, further characterized by:
(A) drive means for said chains, including
(1) a drive shaft operatively connected with said chains,
(2) and means providing a readily disruptable driving connection between the drive shaft and one of said chains to permit the latter to be either advanced or retarded relative to the other chain and thus enable disposition of the hinged cam follower means on one of the chains in either leading, following, or laterally opposite relationship with respect to those on the other chain.

References Cited by the Examiner
UNITED STATES PATENTS

| | | | |
|---|---|---|---|
| 1,986,857 | 1/1935 | Roberts et al. | 93—49 |
| 2,291,063 | 7/1942 | Staude et al. | 93—49 |
| 2,486,074 | 10/1949 | Spinale | 93—49 |
| 2,637,251 | 5/1953 | Spiess | 93—49 |
| 2,896,517 | 7/1959 | Labombarde | 93—49 |

WILLIAM W. DYER, JR., Primary Examiner.
JAMES M. MEISTER, Examiner.